(12) United States Patent
Aso

(10) Patent No.: US 11,794,260 B2
(45) Date of Patent: Oct. 24, 2023

(54) MILLING TOOL

(71) Applicant: TUNGALOY CORPORATION, Fukushima (JP)

(72) Inventor: Takahiro Aso, Iwaki (JP)

(73) Assignee: TUNGALOY CORPORATION, Fukushima (JP)

( * ) Notice: Subject to any disclaimer, the term of this patent is extended or adjusted under 35 U.S.C. 154(b) by 0 days.

(21) Appl. No.: 17/406,038

(22) Filed: Aug. 18, 2021

(65) Prior Publication Data

US 2022/0072633 A1 Mar. 10, 2022

(30) Foreign Application Priority Data

Sep. 7, 2020 (JP) .................................. 2020-149822

(51) Int. Cl.
  *B23C 5/22* (2006.01)
  *B23C 5/10* (2006.01)
  *B23C 5/20* (2006.01)

(52) U.S. Cl.
  CPC .............. *B23C 5/109* (2013.01); *B23C 5/202* (2013.01); *B23C 5/2213* (2013.01); *B23C 2200/125* (2013.01); *B23C 2200/164* (2013.01); *B23C 2210/168* (2013.01)

(58) Field of Classification Search
  CPC . B23C 5/109; B23C 5/2213; B23C 2210/168; B23C 2210/163; B23C 2200/164; B23C 2200/165; B23C 2200/168; B23B 2200/161
  See application file for complete search history.

(56) References Cited

U.S. PATENT DOCUMENTS

| 4,315,706 A * | 2/1982 | Erkfritz | B23B 27/1611 407/101 |
| 4,648,755 A * | 3/1987 | Stashko | B23C 5/109 407/42 |
| 5,944,456 A * | 8/1999 | Shirley | B23C 5/202 407/53 |
| 6,884,008 B2 * | 4/2005 | Minshall | B23D 77/025 407/103 |
| 7,040,844 B1 * | 5/2006 | Daiguji | B23C 5/2213 407/113 |
| 7,972,091 B2 * | 7/2011 | Svenningsson | B23C 5/10 407/116 |

(Continued)

FOREIGN PATENT DOCUMENTS

JP  S58-173422 U  11/1983
JP  2012-510380 A  5/2012

(Continued)

OTHER PUBLICATIONS

Description WO2013039090A1 (translation) obtained at https://worldwide.espacenet.com/ (last visited Jan. 7, 2023).*

*Primary Examiner* — Ryan Rufo
(74) *Attorney, Agent, or Firm* — Studebaker & Brackett PC

(57) ABSTRACT

Provided is a milling tool that allows a life of a tool main body to be elongated. The milling tool includes a replaceable cutting insert and a tool main body in which at least one insert seat that fixes the cutting insert is provided on a distal end side. The tool main body has a reinforcing wall covering at least a portion of the cutting insert when the cutting insert that is in a state of being fixed to the tool main body is viewed from the distal end side.

2 Claims, 13 Drawing Sheets

(56) References Cited

U.S. PATENT DOCUMENTS

| | | | | |
|---|---|---|---|---|
| 8,511,943 B2* | 8/2013 | Gustavsson | ............... | B23C 5/24 407/42 |
| 8,529,163 B2* | 9/2013 | Saji | ............... | B23C 5/2247 407/47 |
| 8,596,933 B2* | 12/2013 | Ryu | ............... | B23C 5/2213 407/42 |
| 8,647,024 B2* | 2/2014 | Saji | ............... | B23C 5/2213 407/34 |
| 8,696,257 B2* | 4/2014 | Saito | ............... | B23C 5/109 407/42 |
| 8,696,263 B2* | 4/2014 | Saji | ............... | B23C 5/20 407/113 |
| 9,089,908 B2* | 7/2015 | Uno | ............... | B23C 5/109 |
| 9,511,427 B2* | 12/2016 | Horiike | ............... | B23B 27/1611 |
| 9,682,433 B2* | 6/2017 | Choi | ............... | B23C 5/2213 |
| 9,889,505 B2* | 2/2018 | Aso | ............... | B23B 27/1662 |
| 10,322,458 B2* | 6/2019 | Kumoi | ............... | B23C 5/202 |
| 10,350,687 B2* | 7/2019 | Kumoi | ............... | B23C 5/20 |
| 11,338,373 B2* | 5/2022 | Hayakawa | ............... | B23C 5/109 |
| 2009/0252566 A1* | 10/2009 | Minshall | ............... | B23D 77/042 407/119 |
| 2011/0236143 A1 | 9/2011 | Ryu | | |
| 2012/0230784 A1* | 9/2012 | Hoefler | ............... | B23C 5/109 407/103 |
| 2012/0230790 A1 | 9/2012 | Uno et al. | | |
| 2017/0304911 A1 | 10/2017 | Kumoi | | |
| 2018/0257155 A1 | 9/2018 | Kitajima et al. | | |
| 2020/0406379 A1* | 12/2020 | Aso | ............... | B23C 5/28 |
| 2021/0205902 A1 | 7/2021 | Hayakawa et al. | | |

FOREIGN PATENT DOCUMENTS

| | | | | |
|---|---|---|---|---|
| JP | 5991563 B2 * | 9/2016 | ............... | B23C 5/006 |
| JP | 2017-056552 A | 3/2017 | | |
| WO | 2011/071007 A1 | 6/2011 | | |
| WO | WO-2011122676 A1 * | 10/2011 | ............... | B23C 5/109 |
| WO | WO-2013039090 A1 * | 3/2013 | ............... | B23C 5/06 |
| WO | 2016/060195 A1 | 4/2016 | | |
| WO | 2019/135290 A1 | 7/2019 | | |

* cited by examiner

PRIOR ART

MILLING TOOL

CROSS-REFERENCES TO RELATED APPLICATIONS

This application relates to and claims priority from Japanese Patent Application No. 2020-149822, filed on Sep. 7, 2020, the entire disclosure of which is incorporated herein by reference.

BACKGROUND

Field

The present invention relates to a milling tool.

Description of Related Art

A replaceable cutting insert is fixed to insert seats of a tool main body. For example, when the insert seats are disposed to be 180-degree symmetrical with each other as in WO 2016/060195, as a tool diameter decreases, a thickness of the tool main body (hereinafter referred to as a web thickness) in the vicinity of a rotation axis interposed between the pair of insert seats decreases. The insert seats have, e.g., seating surfaces and inner wall surfaces to be respectively brought into contact with a bottom surface and a peripheral side surface of the cutting insert. At each of corner portions where the seating surfaces and the inner wall surfaces intersect each other, a stress is likely to be concentrated when cutting resistance is evoked.

SUMMARY

A usable life of the tool main body depends on a portion thereof where a breakage occurs first. The corner portions of the insert seats, at which the stress is likely to be concentrated, are adjacent to the vicinity of the rotation axis where the thickness is smallest, and are therefore more likely to be deformed than the other portions of the tool main body. In addition, the tool main has some portions likely to be deformed other than the corner portions. It is therefore an object of the present invention to provide a milling tool that allows a life of a tool main body to be elongated.

A milling tool according to an aspect of the present invention includes a replaceable cutting insert; and a tool main body, in which at least one insert seat that fixes the cutting insert is provided on a distal end side. The tool main body has a reinforcing wall covering at least a portion of the cutting insert when the cutting insert that is in a state of being fixed to the tool main body is viewed from the distal end side.

According to the aspect, due to the presence of the reinforcing wall, accordingly a thickness of a distal end of the tool main body in a radial direction thereof is increased. Even though a tool diameter is small, the tool main body is unlikely to be deformed. This allows the life of the tool main body to be elongated.

In the aspect described above, the cutting insert may also have a rake surface, a bottom surface on an opposite side to the rake surface, a peripheral side surface connecting the rake surface and the bottom surface, a through hole extending through the rake surface and the bottom surface, and a first main cutting edge formed at a ridge line at which the rake surface and the peripheral side surface intersect each other. The bottom surface may also include a first bottom surface coming closer to the rake surface gradually with approach to a side where the first main cutting edge is located when viewed from a center axis of the through hole and a second bottom surface coming closer to the rake surface gradually with approach to an opposite side to the first main cutting edge when viewed from the center axis. In a state where the cutting insert is fixed to the tool main body, a virtual intersection line, at which a virtual surface obtained by extending the first bottom surface and a virtual surface obtained by extending the second bottom surface intersect each other, may also intersect the reinforcing wall.

In a small-diameter milling tool capable of precisely working a mold or the like, a bottom surface of a cutting insert may be formed into a V-shaped wedge shape. In such a milling tool, a stress is likely to be concentrated not only at corner portions as described above, but also at a boundary portion between two halves of a halved seating surface. According to this aspect, even when the seating surface is halved in conformity with the V-shaped cutting insert, a portion overlying an extension of the virtual intersection line halving the seating surface is reinforced by the reinforcing wall. Accordingly, the portion of the tool main body overlying the extension of the virtual intersection line is unlikely to be deformed.

In the aspect described above, the at least one insert seat may also be a pair of insert seats provided to be spaced apart from each other around a rotation axis of the tool main body. Each of the pair of insert seats may also have a first seating surface to be brought into contact with the first bottom surface. A plane perpendicular to the center axis of the cutting insert is an insert reference plane. In addition, a plane including a normal line to a projection line obtained by projecting, onto a projection plane perpendicular to the rotation axis of the tool main body, the center axis of the cutting insert fixed to either one of the pair of insert seats and including the rotation axis is a body reference plane. At this time, an angle formed between the body reference plane and the first seating surface may also be not more than an angle formed between the insert reference plane and the first bottom surface.

If the angle formed between the body reference plane and the first seating surface is larger than the angle formed between the insert reference plane and the first bottom surface, a web thickness undesirably decreases gradually with distance from the distal end side of the tool main body toward a proximal end side thereof. According to this aspect, the web thickness remains substantially uniform and unchanged or increases gradually with distance from the distal end side of the tool main body toward the proximal end side thereof. Since the web thickness closest to a distal end is minimum and does not decrease any more beyond that, the tool main body is unlikely to be deformed.

According to the present invention, it is possible to provide a milling tool that allows a life of a tool main body to be elongated.

DETAILED DESCRIPTION

Figure 1:
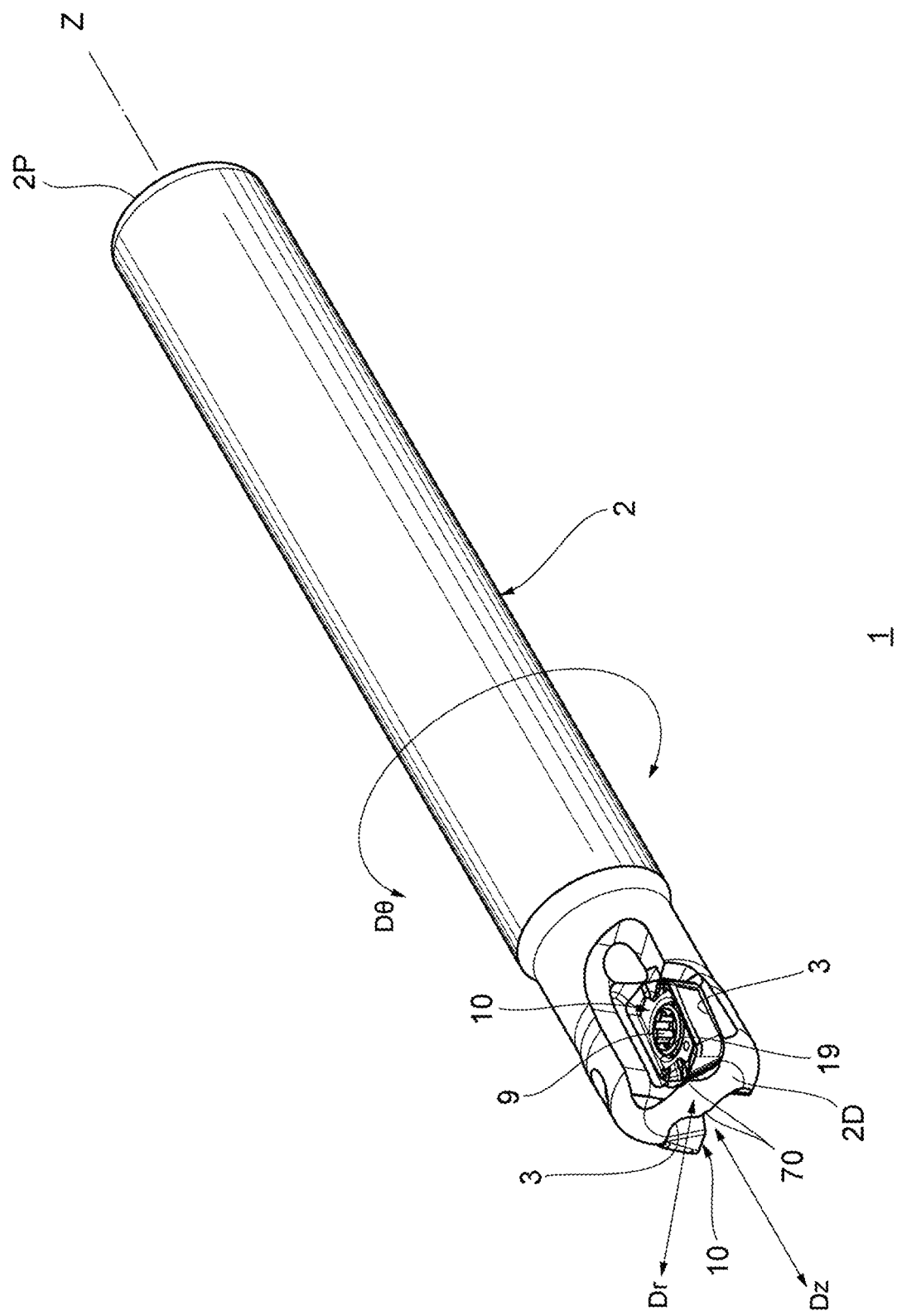
FIG. 1 is a perspective view illustrating an example of a milling tool in an embodiment of the present invention.

Referring to the accompanying drawings, a description will be given of a preferred embodiment of the present invention. Note that, in the individual drawings, components denoted by the same reference numerals have the same or similar configurations. The following will describe each of the configurations in detail with reference to the drawings. FIG. 1 is a perspective view illustrating an example of a milling tool 1 in the embodiment of the present invention. The milling tool 1 is, e.g., an end mill and includes replaceable cutting inserts 10 and a tool main body 2 that fixes the cutting inserts 10. In an illustrated example, the milling tool 1 is configured so as to cut a material to be cut as the milling tool 1 rotates counterclockwise, when viewed from a front side of the paper sheet with FIG. 1.

The tool main body 2 is formed to have, e.g., a cylindrical shape and has insert seats 3 provided in a distal end 2D thereof. A proximal end 2P opposite to the distal end 2D is connected to a main shaft of a working machine. The plurality of insert seats 3 are provided to be spaced apart from each other around a rotation axis Z of the tool main body 2 (in a peripheral direction Dθ of the tool main body 2). In the illustrated example, the pair of insert seats 3 are provided to be 180-degree symmetrical with each other with respect to the rotation axis Z of the tool main body 2. A layout of the insert seats 3 is not limited to that in the illustrated example, and it may also be possible to use an irregular pitch layout in which one of the insert seats 3 is provided not at a position reached by rotating the other insert seat 3 180 degrees around the rotation axis Z, but at an asymmetrical position. In addition, the number of the insert seats 3 may be either 1 or not less than 3.

The individual cutting inserts 10 are fixed to the insert seats 3 of the tool main body 2. In the illustrated example, the insert seats 3 are configured as a screw-on type in which a fastening screw 9 is inserted through a through hole 19 of each of the cutting inserts 10. However, the insert seats 3 are not limited to the screw-on type, and may also be a wedging type.

Figure 2:
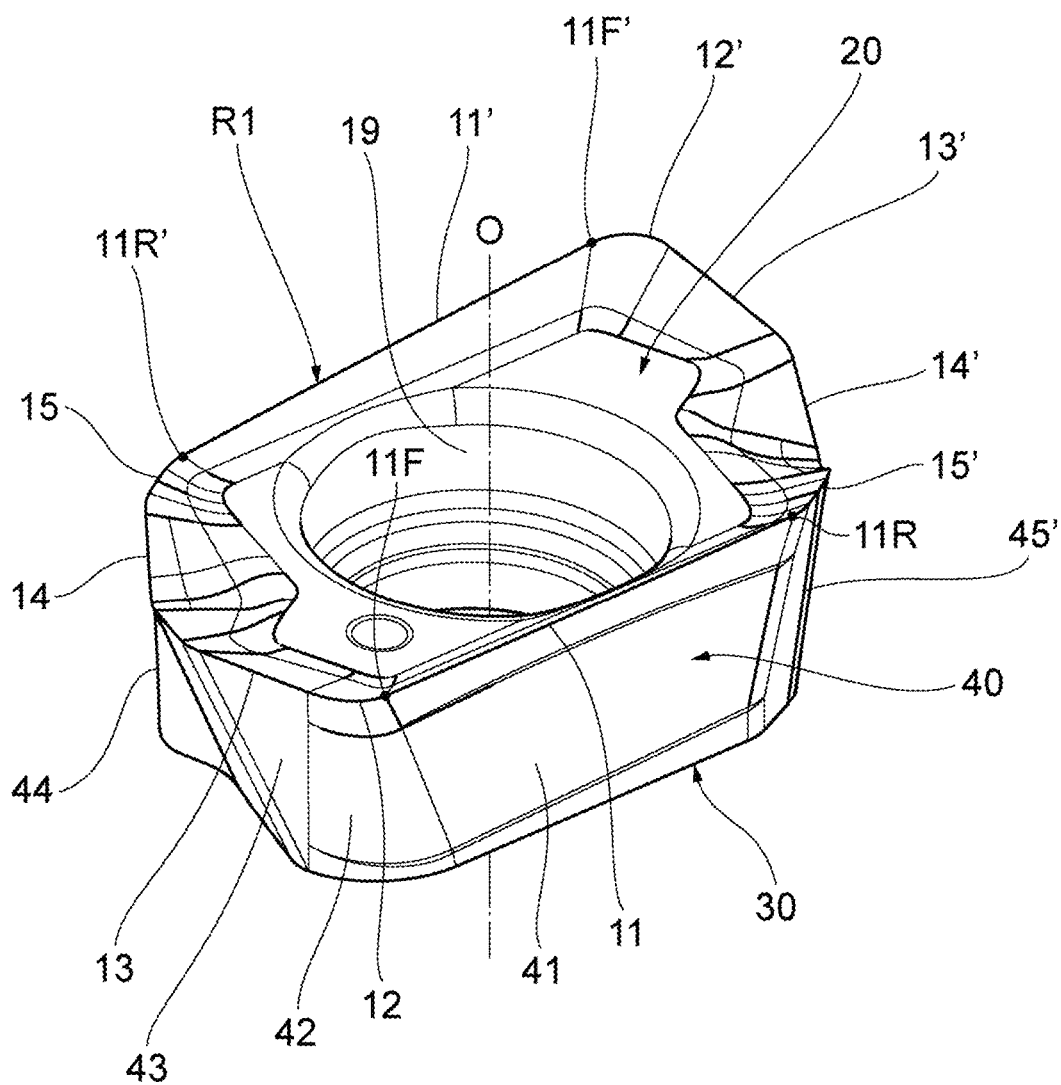
FIG. 2 is a perspective view illustrating an example of a cutting insert illustrated in FIG. 1.

FIG. 2 is a perspective view illustrating an example of each of the cutting inserts 10 illustrated in FIG. 1. As illustrated in FIG. 2, the cutting insert 10 has a rake surface 20, a bottom surface 30 opposite to the rake surface 20, and a peripheral side surface 40 connecting the rake surface 20 and the bottom surface 30. The through hole 19 mentioned above extends through respective centers of the rake surface 20 and the bottom surface 30. The cutting inserts 10 are formed to be 180-degree symmetrical with each other with respect to a center axis O of the through hole 19 used as an axis. In the following description, a direction from the bottom surface 30 to the rake surface 20 may be referred to as an upward direction, a direction from the rake surface 20 to the bottom surface 30 may be referred to as a downward direction, and an axial direction of the center axis O may be referred to as a vertical direction.

The rake surface 20 and the peripheral side surface 40 intersect each other at a first ridge line R1. At least a portion of the first ridge line R1 is formed as a cutting edge. In the illustrated example, the first ridge line R1 includes, as the cutting edge, a pair of main cutting edges (first and second main cutting edges) 11 and 11', a pair of corner cutting edges (first and second corner cutting edges) 12 and 12', a pair of wiper cutting edges (first and second wiper cutting edges) 13 and 13', and a pair of inner cutting edges (first and second inner cutting edges) 14 and 14'. Connecting portions (first and second connecting portions) 15 and 15' connect the cutting edge pairs (11, 12, 13, and 14) on one side and the cutting edge pairs (11', 12', 13', and 14') on the other side, respectively.

The rake surface 20 is formed to have a substantially parallelogram shape. The pair of main cutting edges 11 and 11' are located at longer opposite sides of the rake surface 20. The pair of corner cutting edges 12 and 12' are located at acute angle corners of the rake surface 20. The pair of wiper cutting edges 13 and 13' and the pair of inner cutting edges 14 and 14' are located at shorter opposite sides of the rake surface 20. The connecting portions 15 and 15' are located at obtuse angle corners of the rake surface 20. The corners of the rake surface 20 are portions including, e.g., vertices at which a curvature of the first ridge line R1 has a local maximum value and the vicinities thereof.

The peripheral side surface 40 includes a pair of first side surfaces 41 and 41', a pair of second side surfaces 42 and 42', a pair of third side surfaces 43 and 43', a pair of fourth side surfaces 44 and 44', and a pair of fifth side surfaces 45 and 45'. Of the peripheral side surface 40, the first side surface 41 is a portion facing the first main cutting edge 11, while the first side surface 41' (illustrated in FIG. 3) is a portion facing the second main cutting edge 11'. The second side surface 42 is a portion facing the first corner cutting edge 12, while the second side surface 42' (illustrated in FIG. 3) is a portion facing the second corner cutting edge 12'. The third side surface 43 is a portion facing the first wiper cutting edge 13, while the third side surface 43' (illustrated in FIG. 3) is a portion facing the second wiper cutting edge 13'. The fourth side surface 44 is a portion facing the first inner cutting edge 14, while the fourth side surface 44' is a portion facing the second inner cutting edge 14'. The fifth side surface 45 (illustrated in FIG. 5) is a portion facing the first connecting portion 15, while the fifth side surface 45' is a portion facing the second connecting portion 15'.

The main cutting edges 11 and 11' extend along a longitudinal direction of the rake surface 20 in parallel therewith. In the illustrated example, the main cutting edges 11 and 11' are formed linearly from front ends 11F and 11F' thereof to rear ends 11R and 11R' thereof. The main cutting edges 11 and 11' may also be curved slightly. In a state where the cutting insert 10 is fixed to the tool main body 2 (see FIG.

1), the main cutting edges 11 and 11' cut the material to be cut in a radial direction Dr of the tool main body 2. When the first main cutting edge 11 is used, a first main cutting edge 11 side corresponds to an outer peripheral side in the radial direction Dr when viewed from the center axis O of the through hole 19, while a second main cutting edge 11' side corresponds to a center side in the radial direction Dr when viewed from the center axis O. The front end 11F of the first main cutting edge 11 is disposed on a distal end 2D side of the tool main body 2 in an axial direction Dz, while the rear end 11R of the first main cutting edge 11 is disposed on a proximal end 2P side thereof (main shaft side of the working machine) in the axial direction Dz. When the second main cutting edge 11' is used, the positional relationship between the first and second main cutting edges 11 and 11' is reversed.

In other words, the first main cutting edge 11 side when viewed from the center axis O of the through hole 19 may be referred to also as either one of the outer peripheral side and the center side of the milling tool 1. The second main cutting edge 11' side when viewed from the center axis O may be referred to also as the other of the outer peripheral side and the center side of the milling tool 1. A front end 11F side of the first main cutting edge 11 in an extending direction thereof may be referred to also as either one of the distal end 2D side and the proximal end 2P side of the tool main body 2. A rear end 11R side of the first main cutting edge 11 in the extending direction thereof may be referred to also as the other of the distal end 2D side and the proximal end 2P side of the tool main body 2.

The corner cutting edges 12 and 12' are connected to the front ends 11F and 11F' of the main cutting edges 11 and 11'. The wiper cutting edges 13 and 13' are connected to the corner cutting edges 12 and 12' from a side opposite to the main cutting edges 11 and 11' to extend in the axial direction Dz of the tool main body 2, i.e., a direction substantially perpendicular to the extending direction of the main cutting edges 11 and 11'. The wiper cutting edges 13 and 13' wipe out a surface of the cut material subjected to cutting by the main cutting edges 11 and 11' and the corner cutting edges 12 and 12' to more smoothly finish the finished surface.

The inner cutting edges 14 and 14' are connected to the wiper cutting edges 13 and 13' from a side opposite to the corner cutting edges 12 and 12' to extend in the axial direction Dz of the tool main body 2, i.e., a direction obliquely intersecting the extending direction of the main cutting edges 11 and 11'. The inner cutting edges 14 and 14' cut the cut material remaining after the cutting by the main cutting edges 11 and 11' and the corner cutting edges 12 and 12', which are preceding the inner cutting edges 14 and 14' in a feed direction of the milling tool 1, when lamping processing for cutting in an oblique direction obtained by combining the radial direction Dr and the axial direction Dz of the tool main body 2 is performed.

The connecting portions 15 and 15' are formed at the obtuse angle corners that are not used for cutting to connect the inner cutting edges 14 and 14' and the rear ends 11R and 11R' of the main cutting edges 11 and 11'. In the present invention, the wiper cutting edges 13 and 13', the inner cutting edges 14 and 14', and the connecting portions 15 and 15' are not indispensable constituent features and may also be omitted appropriately.

Figure 3:
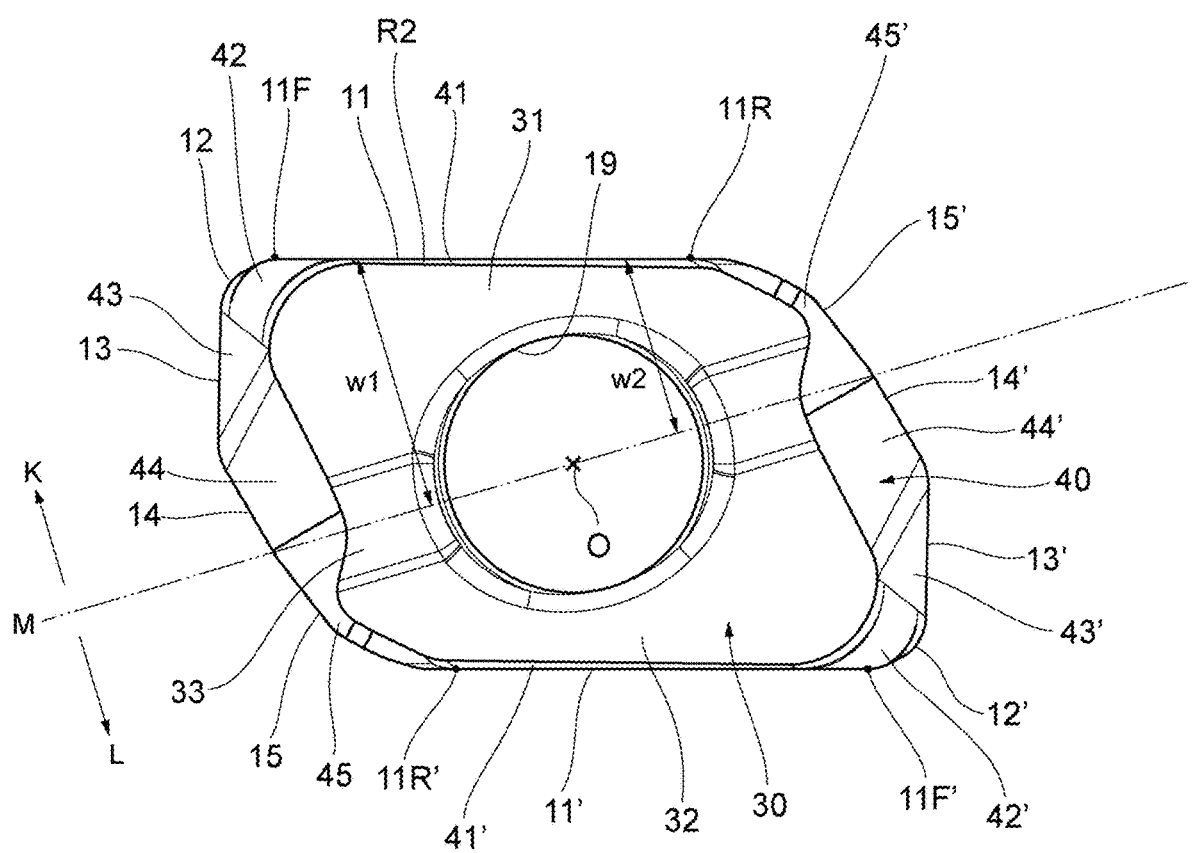
FIG. 3 is a bottom view illustrating a bottom surface of the cutting insert illustrated in FIG. 2.

FIG. 3 is a bottom view illustrating the bottom surface 30 of the cutting insert 10 illustrated in FIG. 2. The bottom surface 30 is formed to have a V-shaped wedge shape (see FIG. 5), and is divided into two or more surfaces, as illustrated in FIG. 3. In the illustrated example, the bottom surface 30 includes a first bottom surface 31, a second bottom surface 32 located opposite to the first bottom surface 31, and a middle connecting surface 33 connecting the first and second bottom surfaces 31 and 32. Each of the surfaces 31, 32, and 33 may also be curved slightly. The middle connecting surface 33 is not an indispensable constituent feature and may also be omitted appropriately. Each of the first and second bottom surfaces 31 and 32 is formed to have a size substantially one-half of that of the bottom surface 30.

The first bottom surface 31 is inclined so as to come closer to the rake surface 20 gradually with approach to the first main cutting edge 11 when viewed from the center axis O of the through hole 19. The second bottom surface 32 is inclined so as to come closer to the rake surface 20 gradually with approach to the second main cutting edge 11' when viewed from the center axis O.

A virtual intersection line M at which a first virtual surface K obtained by extending the first bottom surface 31 and a second virtual surface L obtained by extending the second bottom surface 32 intersect each other is not parallel with the main cutting edges 11 and 11' and obliquely intersects the main cutting edges 11 and 11'. An example of an extending direction of the virtual intersection line M is an extending direction of the belt-like middle connecting surface 33. In the illustrated example, an angle formed between each of the main cutting edges 11 and 11' and the virtual intersection line M is 16.5 degrees. A distance of the virtual intersection line M from the first main cutting edge 11 decreases with distance from the front end 11F side toward the rear end 11R side along the extending direction of the first main cutting edge 11 (w1>w2). In other words, immediately below the first corner cutting edge 12, the first bottom surface 31 is formed to have a large width.

Figure 4:
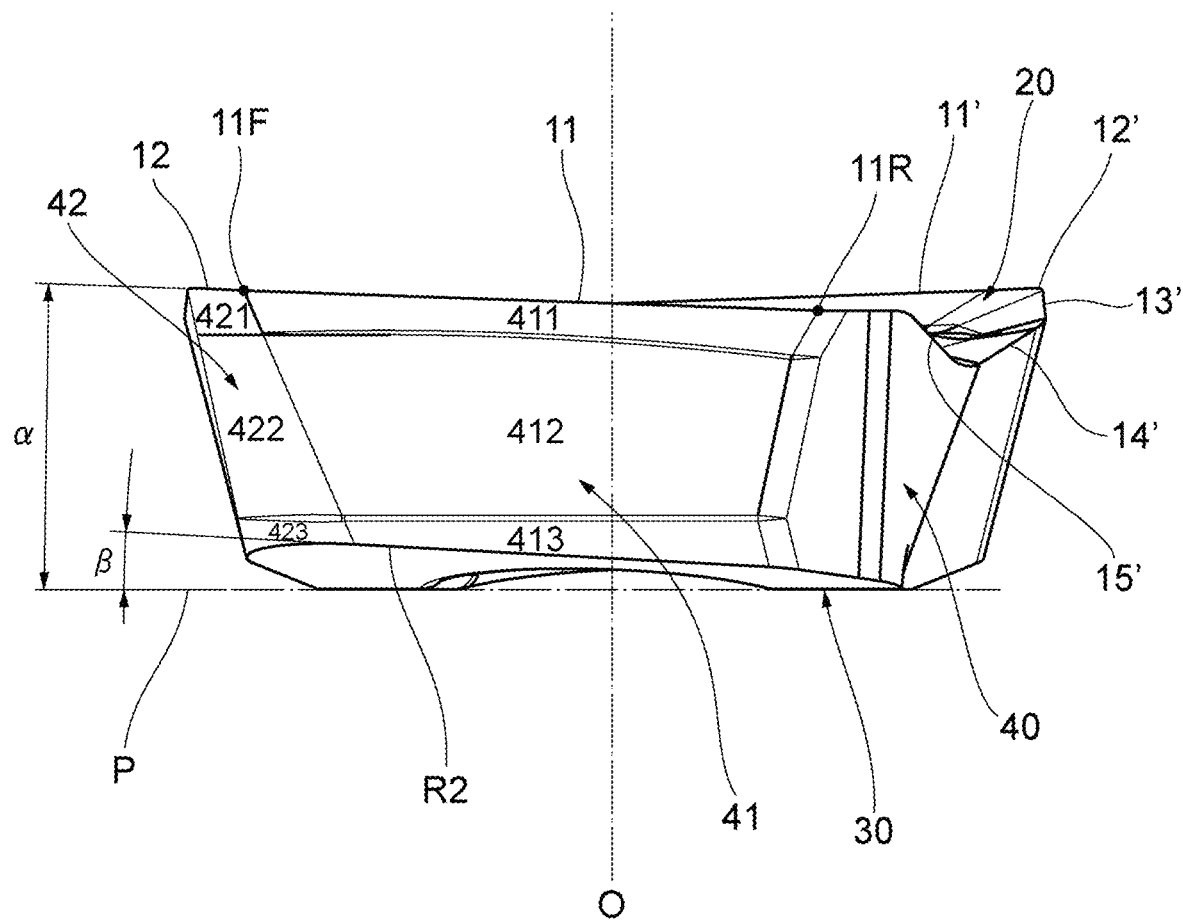
FIG. 4 is a side view illustrating a longitudinal peripheral side surface of the cutting insert illustrated in FIG. 2.

FIG. 4 is a side view illustrating the longitudinal peripheral side surface (first side surface 41) of the cutting insert 10 illustrated in FIG. 2. As illustrated in FIG. 4, the first side surface 41 facing the first main cutting edge 11 is formed such that a distance between the rake surface 20 and the first bottom surface 31, i.e., a thickness of the cutting insert 10 increases gradually with distance from the front end 11F side toward the rear end 11R side along the extending direction of the first main cutting edge 11.

It is assumed that a virtual plane including one end (lower end) of the bottom surface 30 most distant from the rake surface 20 in the vertical direction and perpendicular to the center axis O of the through hole 19 is an insert reference plane P. A second ridge line R2 at which the first bottom surface 31 and the first side surface 41 intersect each other is formed to come closer to the insert reference plane P with distance from the front end 11F side toward the rear end 11R side along the extending direction of the first main cutting edge 11.

The first main cutting edge 11 is formed to come closer to the insert reference plane P and go further away from the second ridge line R2 with distance from the front end 11F side toward the rear end 11R side along the extending direction of the first main cutting edge 11. When an angle formed between the insert reference plane P and the first main cutting edge 11 is assumed to be $\alpha$ and an angle formed between the insert reference plane P and the second ridge line R2 is assumed to be $\beta$, the angle $\alpha$ is slightly smaller than the angle $\beta$. In the illustrated example, the angle $\alpha$ is 2 degrees, while the angle $\beta$ is 3 degrees.

In the illustrated example, the first side surface 41 facing the first main cutting edge 11 is divided into three surfaces in the vertical direction including the downward direction from the rake surface 20 toward the bottom surface 30 and the upward direction reverse to the downward direction to include an upper level surface (flank) 411, an intermediate level surface (restraining surface) 412, and a lower level surface 413. Likewise, the second side surface 42 facing the first corner cutting edge 12 is divided into three surfaces in the vertical direction to include an upper level surface (flank) 421, an intermediate level surface 422, and a lower level surface 423. It may also be possible to omit the lower level surfaces 412 and 423 and divide each of the first and second side surfaces 41 and 42 into two surfaces. The lower level surfaces 413 and 423 are inclined toward a center axis O side of the through hole 19 gradually with approach to the bottom surface 30.

The upper level surface 411 is the flank connected to the first main cutting edge 11 and inclined toward the center axis O side of the through hole 19 gradually with approach to the first main cutting edge 11. Likewise, the upper level surface 421 is the flank connected to the first corner cutting edge 12 and inclined toward the center axis O of the through hole 19 gradually with approach to the first corner cutting edge 12. The intermediate level surface 412 is configured as a restraint surface that is to be restrained by the insert seats 3 of the tool main body 2 in the radial direction Dr when the second main cutting edge 11' is used. The intermediate level surface 412 is formed in parallel with the center axis O of the through hole 19.

Figure 5:
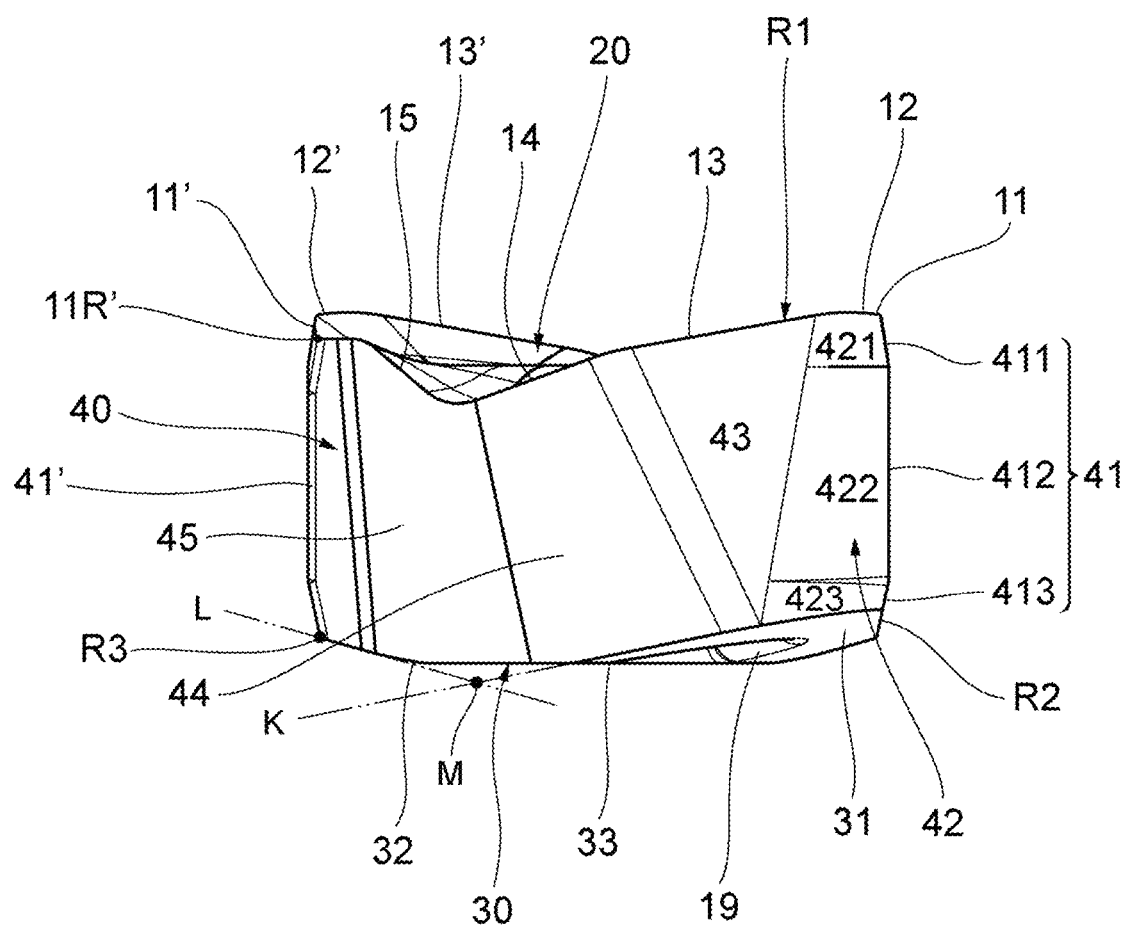
FIG. 5 is a side view illustrating a latitudinal peripheral side surface of the cutting insert illustrated in FIG. 2.

FIG. 5 is a side surface illustrating the latitudinal peripheral side surfaces (second to fifth side surfaces 42 to 45) of the cutting insert 10 illustrated in FIG. 2. As illustrated in FIG. 5, the first corner cutting edge 12 is formed at a position at a largest height from the insert reference plane P of the bottom surface 30 in the vertical direction. The first wiper cutting edge 13 and the first inner cutting edge 14 are formed to gently come down from the first corner cutting edge 12. The first connecting portion 15 is formed so as to go up toward the rear end 11R' of the second main cutting edge 11'.

The cutting insert 10 illustrated in FIG. 5 is disposed in the same manner as when the cutting insert 10 (see FIG. 1) in the state fixed to the tool main body 2 is viewed from the distal end 2D of the tool main body 2. In the illustrated example, at the peripheral side surface 40 of the cutting insert 10, the virtual intersection line M is located immediately below the fifth side surface 45. A reinforcing wall 70 described later is formed so as to cover a major part of the fifth side surface 45 and intersect the virtual intersection line M.

Figure 6:
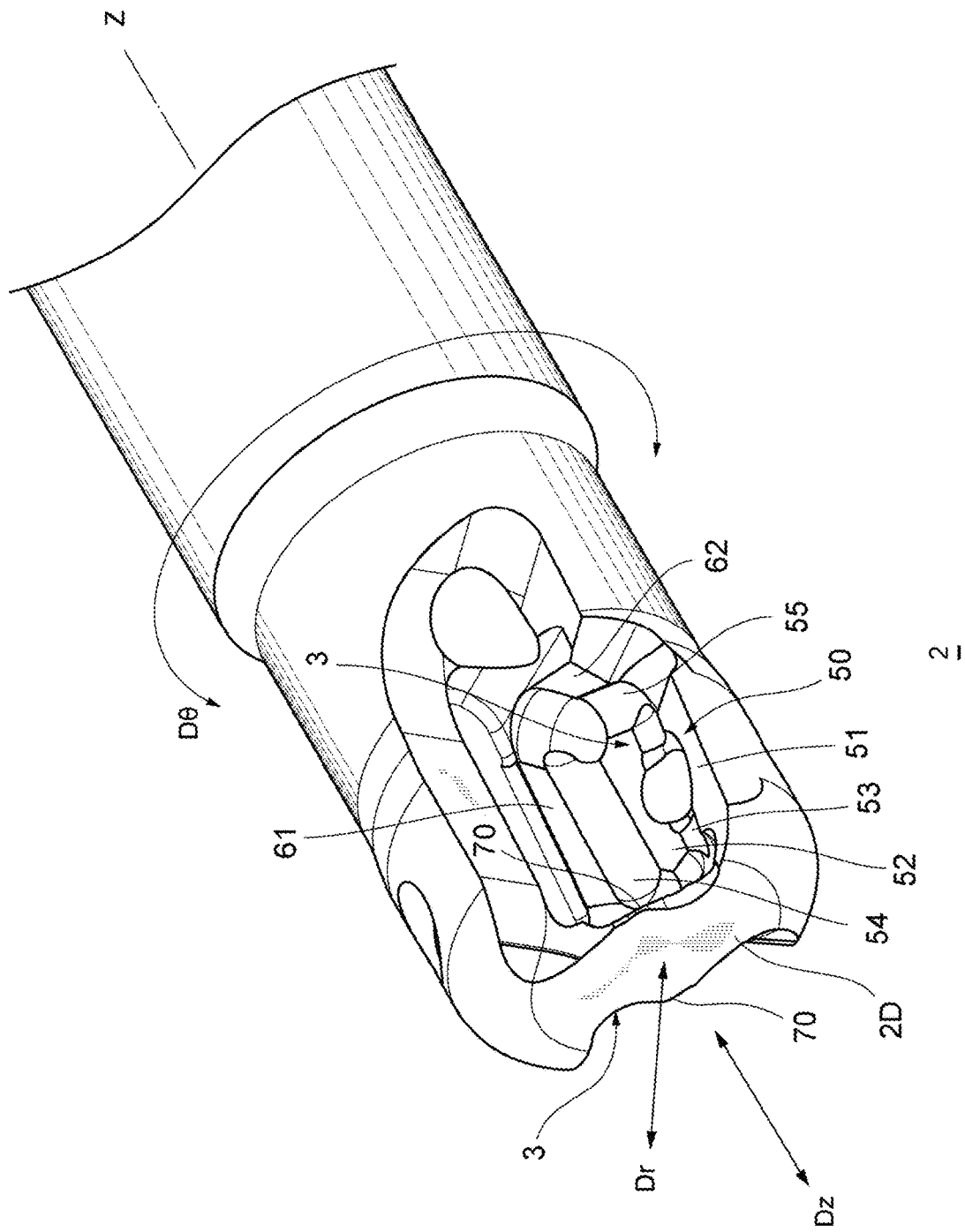
FIG. 6 is a perspective view illustrating an example of an insert seat illustrated in FIG. 1.

FIG. 6 is a perspective view illustrating an example of each of the insert seats 3 illustrated in FIG. 1. The insert seat 3 has a seating surface 50 to be brought into contact with the bottom surface 30 of the cutting insert 10 and inner wall surfaces (first and second inner wall surfaces) 61 and 62 to be brought into contact with the peripheral side surface 40 of the cutting insert 10. The insert seat 3 restrains the cutting insert 10 in three directions, i.e., the peripheral direction Dθ, radial direction Dr, and axial direction Dz of the tool main body 2.

The seating surface 50 includes a first seating surface 51 to be brought into contact with either one of the first and second bottom surfaces 31 and 32 of the cutting insert 10 and a second seating surface 52 to be brought into contact with the other of the first and second bottom surfaces 31 and 32. In a boundary portion 53 between the first seating surface 51 and the second seating surface 52, a recessed portion (recessing) is formed to releasably hold the middle connecting surface 33 of the cutting insert 10 along the virtual intersection line M described above. At the boundary portion 53, a stress is likely to be concentrated.

The first inner wall surface 61 comes into contact with either one of the first side surfaces 41 and 41' of the cutting insert 10 described above. The second inner wall surface 62 comes into contact with any one of the second to fifth side surfaces 42 to 45 and 42' to 45' of the cutting insert 10 described above. At a first corner portion (inner corner) 54 between the seating surface 50 and the first inner wall surface 61 that intersect each other, a recessed portion is formed to releasably hold a third ridge line R3 (illustrated in FIG. 5) at which the first side surface 41' and the second bottom surface 32 intersect each other. Likewise, at a second corner portion 55 between the seating surface 50 and the second inner wall surface 62 that intersect each other, a recessed portion is formed. At each of the corner portions 54 and 55, a stress is likely to be concentrated.

Figure 7:
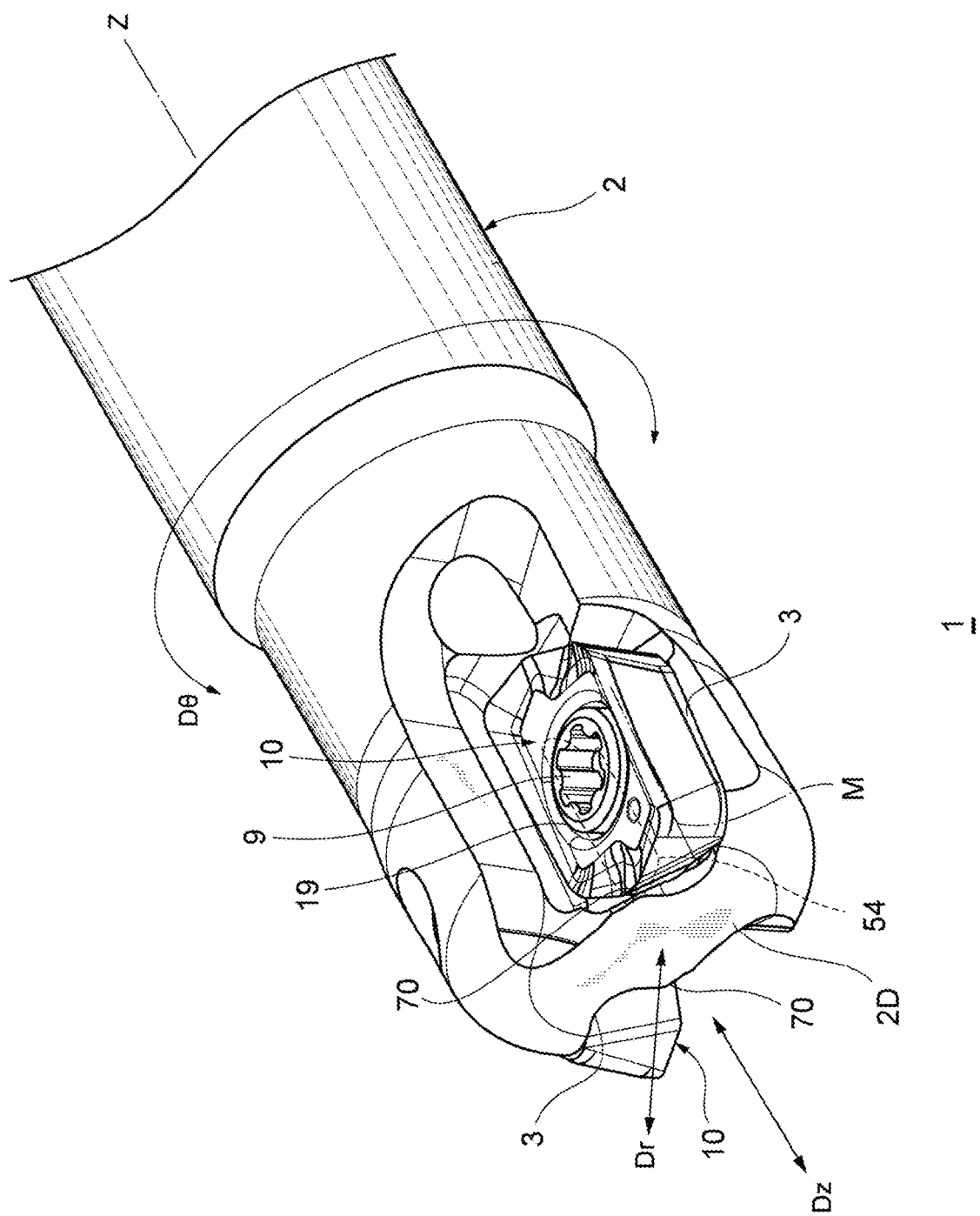
FIG. 7 is a perspective view in which the cutting insert in a state fixed to a tool main body is viewed obliquely.

FIG. 7 is a perspective view in which the cutting insert 10 in the state fixed to the tool main body 2 is viewed obliquely. As illustrated in FIG. 7, the milling tool 1 in the present embodiment has the reinforcing wall 70 that widens from a center side toward an outer peripheral side at the distal end 2D of the tool main body 2. The reinforcing wall 70 covers at least a portion of the cutting insert 10 when the cutting insert 10 in the state fixed to the tool main body 2 is viewed from the distal end 2D side.

Preferably, the reinforcing wall 70 covers the first corner portion 54 and intersects with the virtual intersection line M. In the illustrated example, the reinforcing wall 70 covers a major part of the fifth side surface 45 and a portion of the fourth side surface 44. In a mode in which the reinforcing wall 70 is smallest in size, the first corner portion 54 located closest to the center of the tool main body 2 in the peripheral side surface 40 (second to fifth side surfaces 42 to 45) facing the shorter opposite sides of the rake surface 20 is covered with the reinforcing wall 70. As the reinforcing wall 70 increases, the fifth side surface 45, the fourth side surface 44, the third side surface 43, and the second side surface 42 which are located closer to the outer periphery of the tool main body 2 than the first corner portion 54 are successively covered with the reinforcing wall 70.

Figure 8:
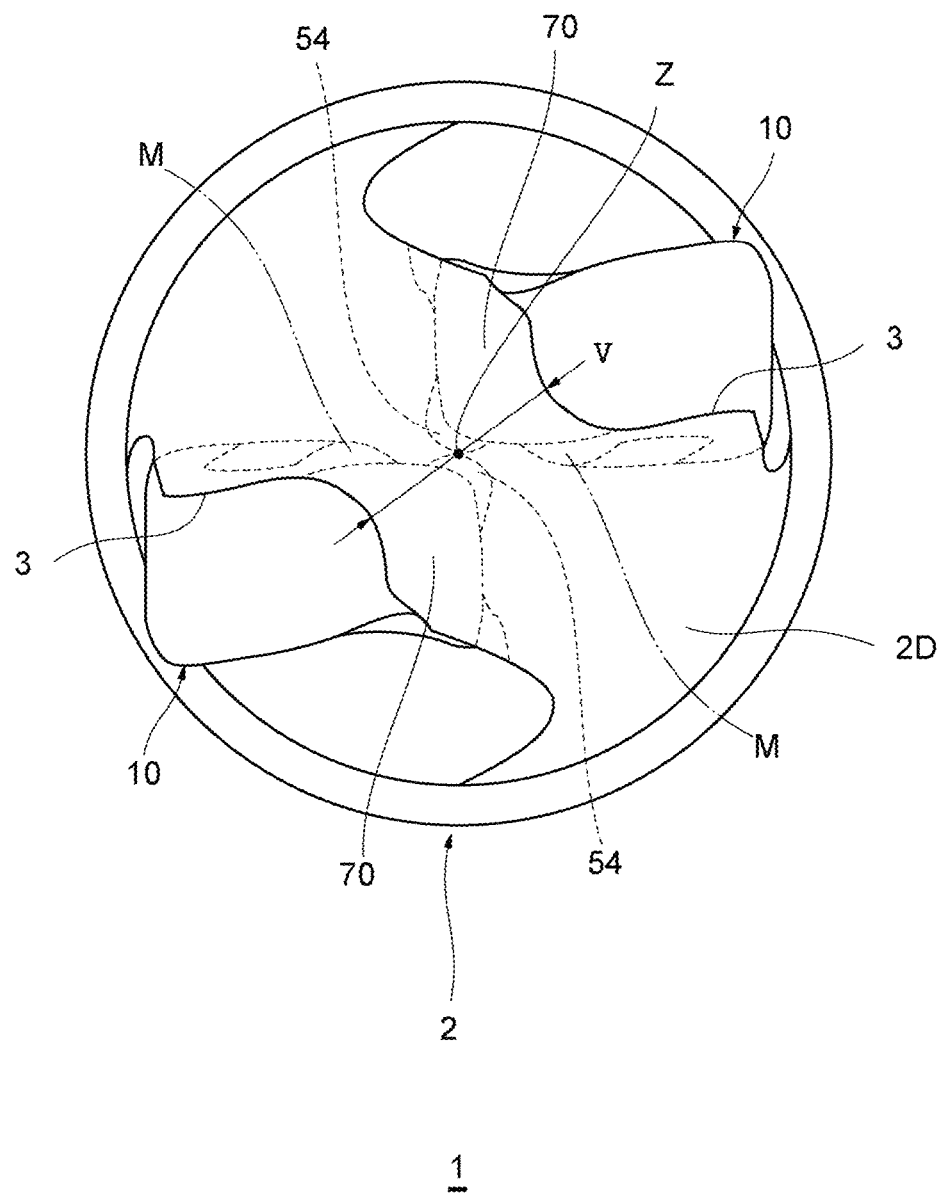
FIG. 8 is a front view in which the cutting insert in the state fixed to the tool main body is viewed from a distal end side.
Figure 11:
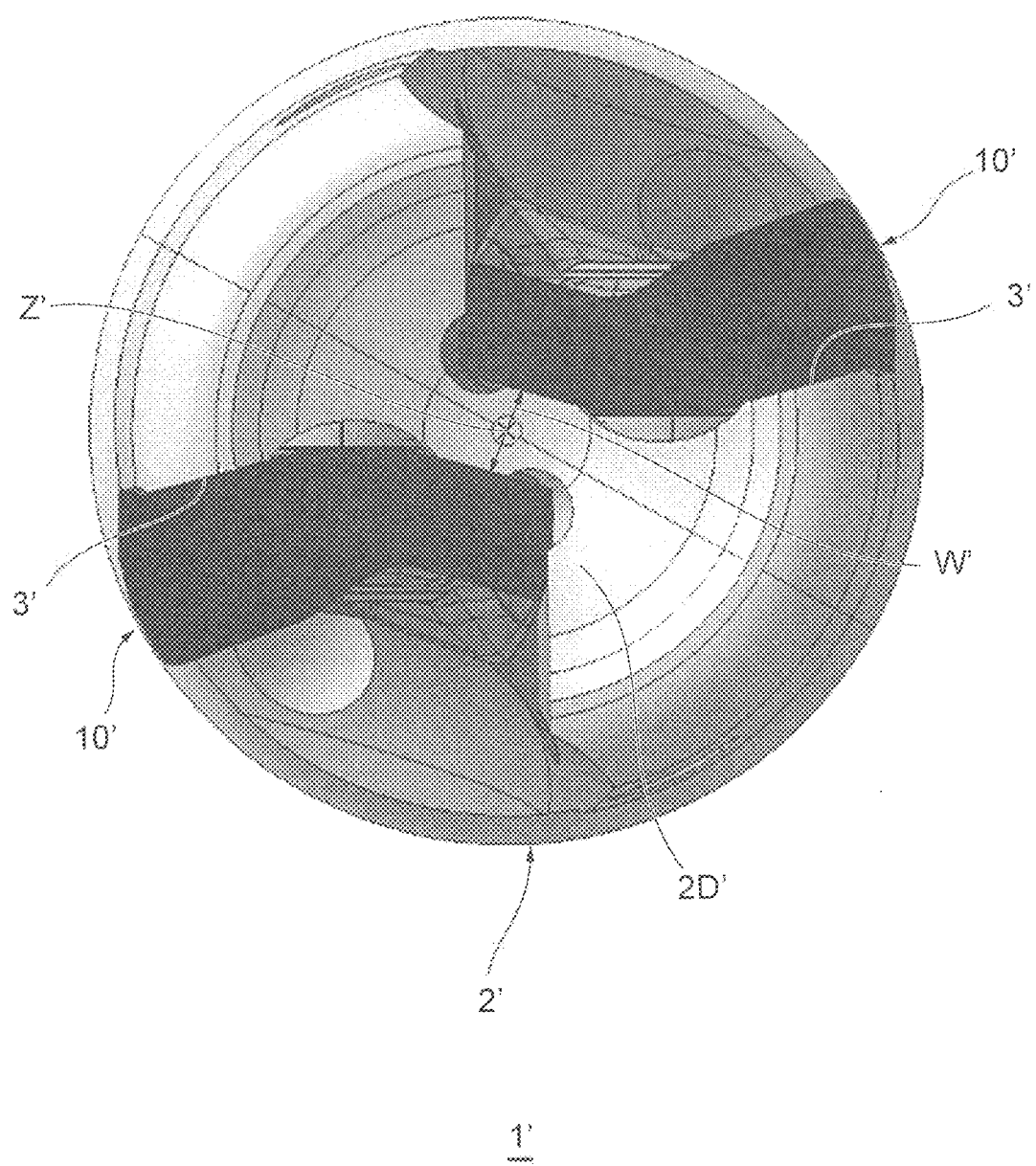
FIG. 11 is a front view in which a conventional milling tool is viewed from a distal end side, which is illustrated for a comparison with the milling tool in FIG. 8.

FIG. 8 is a front view obtained by viewing the cutting insert 10 in the state fixed to the tool main body 2 from the distal end 2D side thereof. FIG. 11 is a front view in which a conventional milling tool is viewed from a distal end side, which is illustrated for a comparison with the milling tool in FIG. 8. In a conventional milling tool 1' illustrated in FIG. 11, as a tool diameter decreases, a web thickness W' of a distal end 2D' of a tool main body 2' in the vicinity of a rotation axis Z' interposed between a pair of insert seats 3' decreases. By contrast, in the milling tool 1 in the present embodiment illustrated in FIG. 8, the thickness accordingly increases due to the presence of the reinforcing wall 70 to be able to ensure a large thickness V of the distal end 2D of the tool main body 2 in the radial direction Dr.

Figure 9:
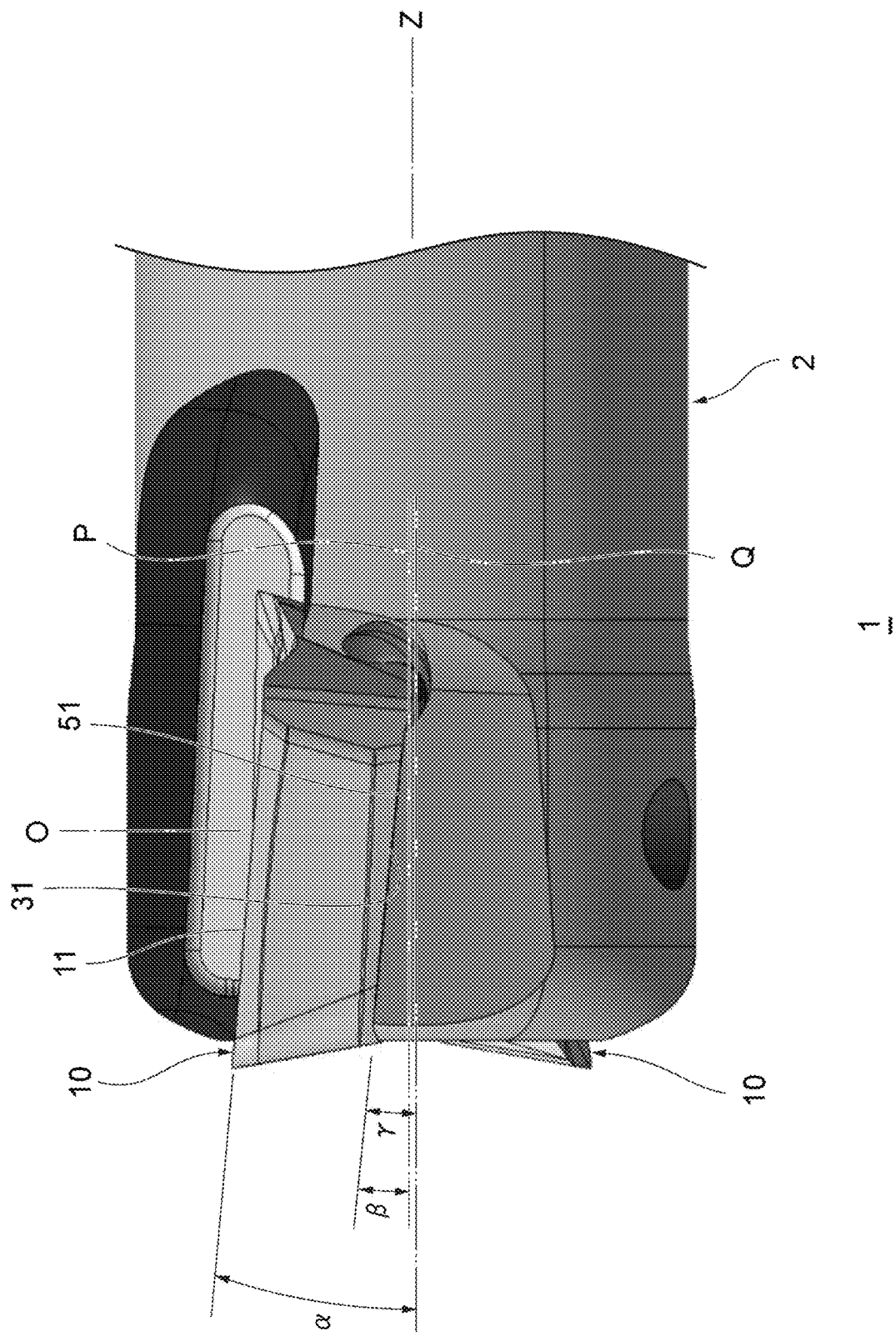
FIG. 9 is a side view when an angle formed between a body reference plane and a first seating surface is the same as an angle formed between an insert reference plane and a first bottom surface.

It is assumed that a plane including two straight lines, i.e., a normal line to a projection line obtained by projecting, onto a projection plane perpendicular to the rotation axis Z of the tool main body 2, the center axis O of the cutting insert 10 fixed to either one of the pair of insert seats 3 and the rotation axis Z of the tool main body 2 is a body reference plane P. FIG. 9 is a side view when an angle γ formed between the body reference plane P and the first seating surface 51 is the same as an angle formed between the insert reference plane P and the first bottom surface 31.

In the illustrated example, the angle formed between the insert reference plane P and the first bottom surface 31 is the same as the angle β formed between the insert reference plane P and the second ridge line R2 described above, the angle β is 3 degrees, and the angle γ is 3 degrees. The insert reference plane P is disposed in parallel with the rotation axis Z of the tool main body 2. In this case, the angle α formed between the insert reference plane P and the first main cutting edge 11 described above directly corresponds to an axial rake angle of the milling tool 1. In the illustrated example, the angle α is 2 degrees.

In the present embodiment, the first main cutting edge 11 is placed at the positive angle α with respect to the insert reference plane P, and therefore there is no need to incline the insert reference plane P with respect to the rotation axis Z of the tool main body 2 to provide the axial rake angle. In general, when the first main cutting edge 11 is placed at the positive angle α in the cutting insert in which the insert reference plane P is parallel with the first bottom surface 31, with distance from the front end 11F side of the first main cutting edge 11 toward the rear end 11R side thereof, a thickness from the first bottom surface 31 to the rake surface 20 decreases.

In the present embodiment, the angle β formed between the insert reference plane P and the first bottom surface 31 is larger than the angle α. Accordingly, even though the angle α is positive, the thickness of the cutting insert 10 increases gradually with distance from the front end 11F side of the first main cutting edge 11 toward the rear end 11R side thereof. It is possible to ensure rigidity of the cutting insert 10 on the rear end 11R side of the first main cutting edge 11.

Figure 10:
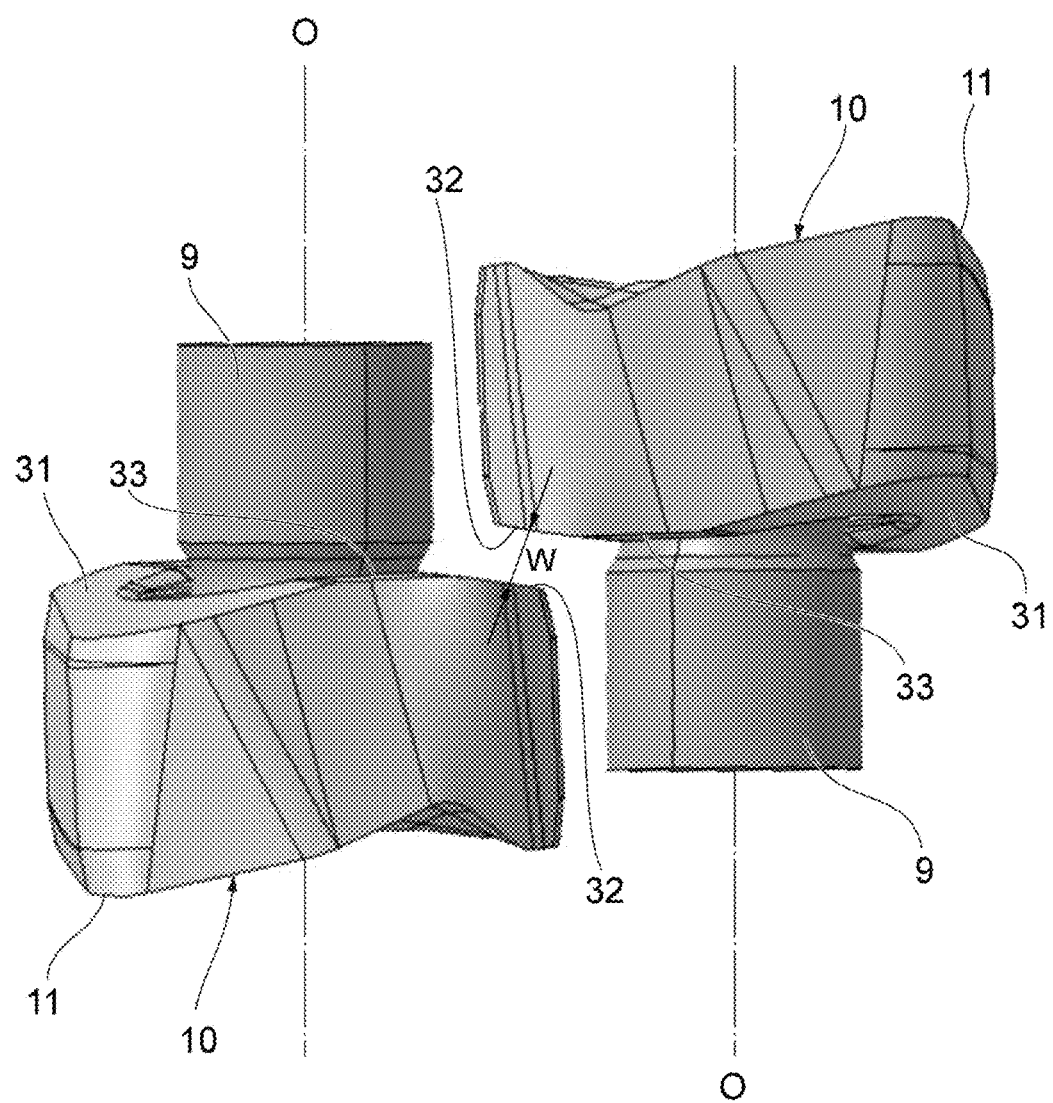
FIG. 10 is a front view illustrating a positional relationship between a pair of the cutting inserts illustrated in FIG. 9.

FIG. 10 is a front view illustrating a positional relationship between a pair of the cutting inserts 10 illustrated in FIG. 9. As illustrated in FIG. 10, when the angles γ and β are equal, the second bottom surface 32 of the cutting insert 10 fixed to one of the insert seats 3 is parallel with the second bottom surface 32 of the cutting insert 10 fixed to the other insert seat 3.

Figure 12:
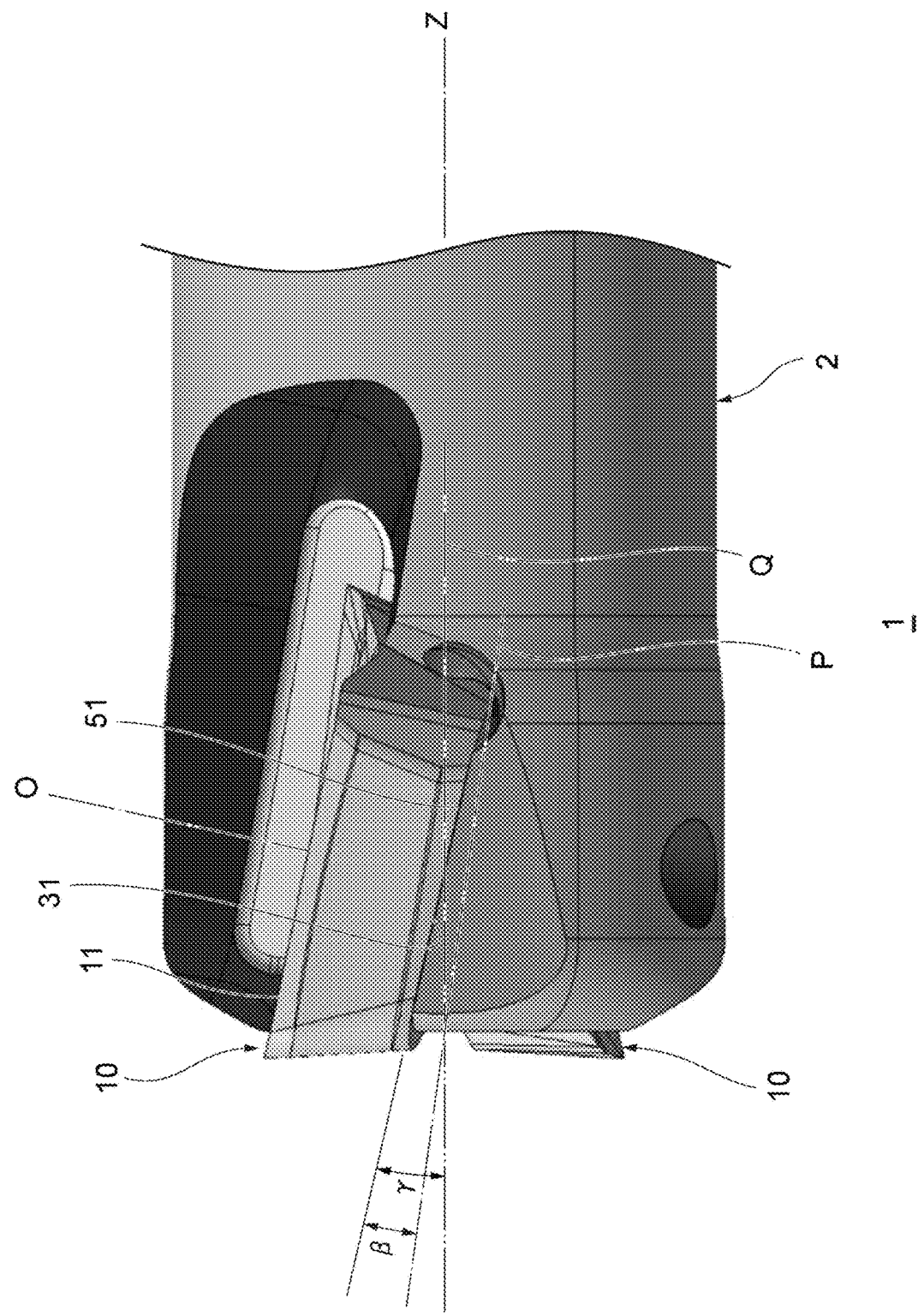
FIG. 12 is a side view when an angle formed between the body reference plane and the first seating surface is larger than the angle formed between the insert reference plane and the first bottom surface, which is shown for a comparison with FIG. 9.
Figure 13:
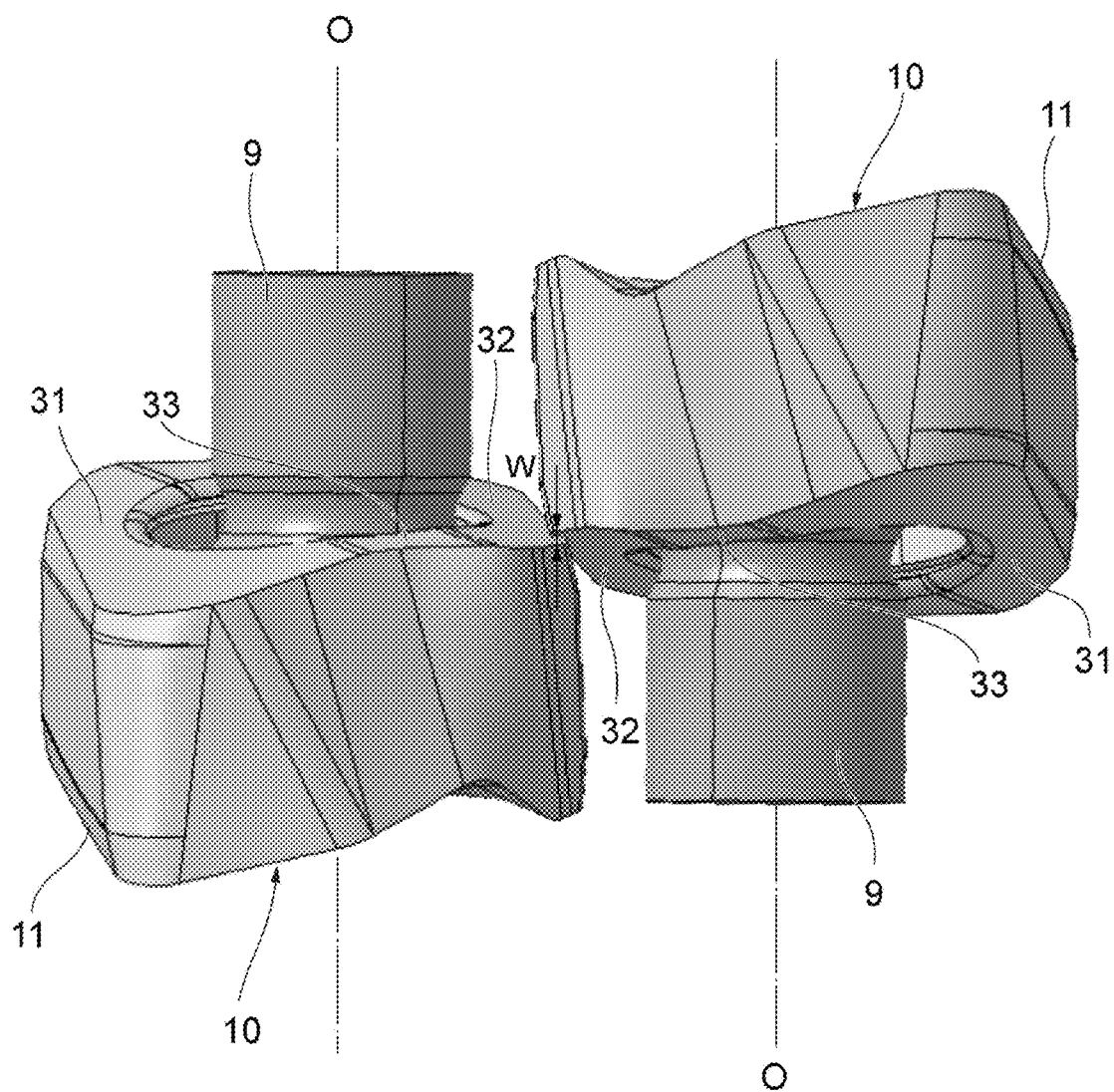
FIG. 13 is a front view illustrating a positional relationship between a pair of cutting inserts illustrated in FIG. 12.

FIG. 12 is a side view when an angle γ' formed between the body reference plane P and the first seating surface 51 is larger than the angle β formed between the insert reference plane P and the first bottom surface 31, which is shown for comparison with FIG. 9. In the illustrated example, the angle β is 3 degrees, while the angle γ' is 10 degrees. FIG. 13 is a front view illustrating the positional relationship between the pair of cutting inserts 10 illustrated in FIG. 12.

When the angles γ' and β are not equal, the second bottom surface 32 of one of the cutting inserts 10 is not parallel with that of the other cutting insert 10. When the angle γ' is larger than the angle β as illustrated in FIG. 12, as illustrated in FIG. 13, with approach to the proximal end 2P side of the tool main body 2 along the axial direction Dz thereof, a distance between one of the cutting inserts 10 to the other cutting insert 10 decreases. As a result, the web thickness W of the tool main body 2 decreases or the cutting inserts 10 interfere with each other.

Note that, in the milling tool 1 in the present embodiment, the angle γ formed between the body reference plane P and the first seating surface 51 may also be set smaller than the angle β formed between the insert reference plane P and the first bottom surface 31 within a range that allows the axial rake angle to be appropriately set. In that case, while the axial rake angle decreases, the web thickness W in the vicinity of the rotation axis Z interposed between the pair of cutting inserts 10 increases gradually with distance from the distal end 2D side of the tool main body 2 toward the proximal end 2P side thereof.

In the milling tool 1 according to the present embodiment, the web thickness W of the tool main body 2 remains substantially uniform and unchanged or, alternatively, the web thickness W increases gradually with distance from the distal end 2D side of the tool main body 2 toward the proximal end 2P side thereof. Since the web thickness W is minimum on the distal end 2D side and does not decrease any more, the tool main body 2 is unlikely to be deformed. This allows the life of the tool main body 2 to be elongated.

The embodiments described above are intended to facilitate understanding of the present invention and should not be construed to limit the present invention. Constituent elements included in the embodiments and arrangements, materials, conditions, shapes, sizes, and the like thereof are not limited to those exemplified and can appropriately be modified. It is also possible to partially substitute or combine configurations described in different embodiments.

What is claimed is:

1. An end mill comprising:
a replaceable cutting insert including a rake surface having a substantially parallelogram shape, a bottom surface on an opposite side to the rake surface, a peripheral side surface extending between, and connecting, the rake surface and the bottom surface, a through hole extending through the rake surface and the bottom surface, and at an intersection ridge line at which the rake surface and the peripheral side surface intersect each other, a first main cutting edge and a first corner cutting edge are both formed,
the substantially parallelogram shape having oppositely positioned first sides and oppositely positioned second sides, and in a plan view of the rake surface, the first sides are longer than the second sides,
the peripheral surface including oppositely positioned first side surfaces that respectively correspond to the first sides of the substantially parallelogram shape and oppositely positioned second side surfaces that respectively correspond to the second sides of the substantially parallelogram shape,
the first main cutting edge is located at one of the first sides of the substantially parallelogram shape,
the first corner cutting edge is located at an acute angle corner of the rake surface and connected to the first main cutting edge,
the bottom surface including a first bottom surface that comes closer to the rake surface gradually toward the first main cutting edge when viewed from a central axis of the through hole in a first direction perpendicular to the central axis, and a second bottom surface that comes closer to the rake surface gradually toward a second main cutting edge opposite, and parallel to, the first main cutting edge when viewed from the central axis in a second direction perpendicular to the central axis, each of the first bottom surface and the second bottom surface being substantially one-half of the bottom surface,
the first bottom surface and the second bottom surface define respective first and second planes, a virtual intersection line is defined by an intersection of the first and second planes, and in a plan view of the bottom surface, the virtual intersection line intersects the central axis and is not parallel with the first main cutting edge; and
a tool main body extending along a rotation axis between a proximal end surface of a shank portion and a distal end surface of a cutting portion, the distal end surface being transverse to the rotation axis, the tool main body having an insert seat intersecting the distal end surface, the cutting insert replaceably fixed to the insert seat, the tool main body distal end surface having a reinforcing wall that covers a portion of one of the second side surfaces of the peripheral side surface in a distal end view parallel to the rotation axis, wherein the first main cutting edge extends in an axial direction of the tool main body and cuts a work material in a radial direction of the tool main body in a state where the cutting insert is fixed to the tool main body, wherein and the virtual intersection line intersects the reinforcing wall, and wherein in the plan view of the rake surface of the insert replaceably fixed to the tool main body, the intersection line is inclined relative to the rotation axis.

2. The end mill according to claim 1, wherein the ridge line includes a first connecting portion which is not used for cutting and is located at an obtuse angle corner of the substantially parallelogram shape, and the portion of the one of the second side surfaces of the peripheral side surface covered by the reinforcing wall in the distal end view is adjacent to the first connecting portion.

\* \* \* \* \*